(12) United States Patent
Hirtz et al.

(10) Patent No.: US 10,919,212 B1
(45) Date of Patent: Feb. 16, 2021

(54) MECHANIZED INVERTER FOR PIPE LINERS

(71) Applicant: SAK CONSTRUCTION LLC, O'Fallon, MO (US)

(72) Inventors: Steve Hirtz, O'Fallon, MO (US); Scott Campbell, Arnold, MO (US); Jeff Hirtz, Wentzville, MO (US); Jason Laney, Wentzville, MO (US); Kyle Presley, Troy, MO (US)

(73) Assignee: SAK CONSTRUCTION LLC, O'Fallon, MO (US)

( * ) Notice: Subject to any disclaimer, the term of this patent is extended or adjusted under 35 U.S.C. 154(b) by 0 days.

(21) Appl. No.: 16/540,490

(22) Filed: Aug. 14, 2019

(51) Int. Cl.
| | | |
|---|---|---|
| *B29C 63/36* | (2006.01) | |
| *F16L 55/162* | (2006.01) | |
| *F16L 55/165* | (2006.01) | |
| *B29L 23/00* | (2006.01) | |

(52) U.S. Cl.
CPC .......... *B29C 63/36* (2013.01); *F16L 55/1651* (2013.01); *B29L 2023/006* (2013.01)

(58) Field of Classification Search
CPC ............... F16L 55/1651; F16L 55/1655; F16L 55/1654; B29C 63/36
See application file for complete search history.

(56) References Cited

U.S. PATENT DOCUMENTS

| | | | | |
|---|---|---|---|---|
| 4,427,480 A | * | 1/1984 | Kamuro .................. | B29C 63/36 138/140 |
| 4,995,929 A | * | 2/1991 | Menzel ................. | B29C 53/827 156/187 |
| 6,029,726 A | | 2/2000 | Tweedie et al. | |
| 6,619,886 B1 | * | 9/2003 | Harrington ............. | B29C 63/36 405/184.2 |
| 6,637,092 B1 | * | 10/2003 | Menzel ................... | B29C 63/32 29/451 |
| 6,696,174 B2 | | 2/2004 | Cercone et al. | |
| 7,455,117 B1 | * | 11/2008 | Hall ......................... | E21B 7/20 166/378 |
| 7,857,932 B1 | * | 12/2010 | Driver ..................... | B29C 53/50 156/203 |
| 2002/0124898 A1 | | 9/2002 | Renaud et al. | |
| 2011/0052325 A1 | | 3/2011 | Bateman et al. | |
| 2012/0312407 A1 | | 12/2012 | Muhlin et al. | |

(Continued)

FOREIGN PATENT DOCUMENTS

| | | | |
|---|---|---|---|
| JP | 2015-523234 | | 8/2015 |
| JP | 2015523234 | * | 8/2015 |

*Primary Examiner* — Sean D Andrish
(74) *Attorney, Agent, or Firm* — Lewis Rice LLC

(57) ABSTRACT

A system and method for efficiently and safely installing a pipe liner is provided, as well as methods of using the same. The system and method for efficiently and safely installing a pipe liner may provide an inverter configured to invert the pipe liner by introducing pressure into the pipe liner; provide a top roller, provide an assist system located between the inverter and the top roller, the assist system comprising: a main housing having a main housing top and a main housing bottom, and each of the main housing top and the main housing bottom having an opening; a first interior roller; a second interior roller; and a first motor; and feed the pipe liner onto the top roller, wherein the assist system feeds the pipe liner from the top roller to the inverter in an efficient and controller manner.

18 Claims, 6 Drawing Sheets

(56) References Cited

U.S. PATENT DOCUMENTS

| | | |
|---|---|---|
| 2013/0019985 A1 | 1/2013 | Kobayashi |
| 2014/0048151 A1 | 2/2014 | Bichler |
| 2015/0338014 A1 | 11/2015 | Bichler |

* cited by examiner

MECHANIZED INVERTER FOR PIPE LINERS

BACKGROUND OF THE INVENTION

1. Field of the Invention

This disclosure is in the field of pipe rehabilitation systems, specifically to systems and methods for installing cured-in-place pipe liners using a mechanized inverter.

2. Description of the Related Art

Over time, underground pipelines utilized for the transport of fluids, gases, or other materials become damaged, worn, corroded, or any combination thereof from use and environmental factors. In the past, the methodologies utilized for rehabilitating underground pipelines were costly, labor intensive, and usually required the surrounding ground to be excavated to reach the pipe. The damaged section of pipe would then be patched or replaced, and the excavated ground refilled. This technique is severely disruptive to the surrounding environment and communities.

To avoid these problems, "trenchless" techniques were developed. One such trenchless technique is cured-in-place pipe, or CIPP. A CIPP liner is a jointless and seamless pipe liner placed inside an existing pipe, referred to in the art as the "host pipe." CIPP can be used to rehabilitate pipes in the water, sewer, gas, and chemical industries. In a CIPP rehabilitation, a felt tube is saturated with a resin and then inverted or pulled into the host pipe. The resin saturation process is known as "resin impregnation" or "wet-out." The resin-saturated felt tube is typically inverted into the host pipe from an upstream access point, such as a manhole. Once in place, the resin-impregnated felt tube is allowed to cure forming a tight-fitting, jointless liner contained within the host pipe. The curing process typically uses heat (possibly ambient) or ultraviolet radiation to cure the resin and harden the liner.

An embodiment of this prior art process is depicted in FIG. 1. Underground pipes typically comprise a main service line 101, also referred to herein as the host pipe. In the depicted figure, the main line 101 is buried underground and accessible through a number of vertical tunnels 104. These tunnels 104 are accessible through an opening 102 at the surface 106. The opening 102 may be, for example, a manhole 102. Usually, the main 101 is connected to one or more service laterals 103, which are small service lines 103 that direct flow to/from the main 101 to service points, such as a building.

Over time, the main 101 becomes clogged with debris and natural obstructions, such as roots and pieces of broken pipe. Typically, pipe rehabilitation begins by cleaning out the main 101. This may be done using any number of techniques, ranging from manual removal to use of remote cleaning technology, such as a high-pressure water jetter. Next, the cleaned pipe 101 interior is visually inspected, such as by using a remote camera system. This system is generally a mobile closed circuit camera system providing illuminated real-time images of the host pipe 101 interior to a remote operator by wired or wireless connection. In this stage, the camera inspects the host pipe 101 interior for remaining debris, or other problems that could inhibit the proper installation of a CIPP liner.

Once the host pipe 101 is cleaned and ready to accept a liner, a liner 109 is impregnated with resin. The liner 109 itself is generally a felt tube, generally made of a textile, polyester, fiberglass cloth, hybrid material composite, or another material suitable for resin impregnation. The resin impregnation process ranges from simple to sophisticated. In a simple embodiment, a set of rollers is used to distribute the resin over the tube. However, prevailing industry standards recommend that the tube be vacuum-impregnated, such as by a vacuum pump. This is because an uneven or incomplete distribution of resin will result in "dry" areas that do not properly cure, resulting in non-uniform thickness and weak points subject to structural failure.

Most resins are cured by the application of heat, and may begin to cure at room temperature. Thus, the preferred technique is to cool the liner 109 as it is being impregnated. The liner 109 is generally stored in a cooled environment during impregnation, such as an ice bath, and is kept chilled for transportation to the installation site, such as via a refrigerated truck. The process of impregnating the liner 109, known in the art as "wet-out," may take place onsite, such as in a specially designed mobile wet-out vehicle, but is more commonly performed at a special-purpose facility and trucked cold to the installation site.

To install, the resin-saturated liner 109 is connected to an inverter, which is a specially designed device to increase air pressure within an inverted liner 109 and allow it to extend or "crawl" through the pipe to be rehabilitated. The liner 109 is usually fed into the inverter by hand or by other manual deployment. This typically involves sealing the liner 109 at one end, and attaching a pullback line to the sealed end. The liner 109 is then folded into a pile proximate to the inverter. The inverter comprises a pressurization applicator built into an inverter body, which body has an egress pipe at one end. Once the saturated liner 109 is folded into its pile, the lead end of the folded liner 109 is fed out through the egress pipe. The lead end is folded back or cuffed around the egress pipe from the inverter, which allows the inversion process to begin.

Pressure is applied within the inverter via water or air 118, forcing the liner 109 to invert progressively into the host pipe. Because the liner 109 is still in a wet state, it can negotiate corners and bends, conforming to the interior shape of the host pipe. The liner 109 is then cured, usually through the application of hot water, steam, or another source of heat. Alternately, the liner 109 may automatically cure, depending on the ambient temperature and temperature of the host pipe. Once the liner 109 is cured, the ends are cut open and another visual inspection is conducted to confirm that the installation was successful.

One problem with this process is that the liner 109 must be manually fed into the inverter. In some instances, this manual feeding process may require an operator to pull or lift sections of the liner 109 periodically to feed additional material into the inverter, section-by-section. These manual processes, which are known in the art, are often inconsistent in the speed that the liner 109 is fed into the inverter and in the amount of force applied to the liner 109 while being fed into the inverter. As a result, the quality of the finished liner may be compromised. The inconsistent inversion speeds and/or forces may bunch or stretch the liner 109 as it is being installed, resulting in weak points along the liner 109. The weak points may include possible wrinkles, bumps, thin sections, or even tears. Further, these inconsistencies in the inversion process may lead to inconsistent curing of the liner 109 once installed. Such an inconsistent curing may cause weak points to form within the liner 109, degrading the structural integrity of the liner 109.

Another problem with the prior art inversion process is the application of too much pressure to the liner 109. When the liner 109 is manually fed into the inverter, drag is placed on the inversion process due to the inconsistent nature of manual feeding. This drag increases the water or air pressure 118 required for inverting the liner 109. These pressure increases constitute safety concerns for equipment and persons in the area of the inverter because higher pressures result in more energy being released in the case of any failure along the pressurized regions. Additionally, increased pressure in the liner 109 may cause increased pressure to build within the host pipe 101, potentially causing problems for both the liner 109 and the host pipe 101. For example, increased pressure may compromise the structural integrity of the host pipe 101, which often is already damaged from use. Stresses from excessive pressures may subvert the structural integrity of at least portions of the liner 109. Further, lower inverting pressures are desirable because such lower pressures result in a thicker and more uniform finished liner 109.

Further, in some uses, there may a gap between the inverter and the host pipe 101, which gap may be known in the art as the "downtube portion." At the downtube portion, the liner 109 experiences excess pressures because the liner 109 is not constrained by either the inverter or the host pipe 101. Increased pressures may cause this area of the liner 109 to bend and stretch, subverting its structural integrity. This stretching process may negatively affect the curing process at this area of the liner 109. Further, as the liner 109 stretches and bends, the reduced structural integrity may cause the liner 109 to rupture, which may itself be very dangerous due to rapid depressurization. In other situations, as the pressure inside the liner 109 builds, the downtube portion may stiffen, which may at least partially lift the inverter. This lifting may lead to an inverter that is unstable in its positioning or even lifted from the ground. This lifting may be very dangerous to equipment and persons in the area of the inverter due to the weight of the inverter and the unpredictable nature of its movement when being lifted.

Additionally, the inversion process is generally a manual, human controlled process. For example, the air pressure 118 is typically controlled by a human who alters the pressure by turning a valve controlled by a lever. The human operator has a limited ability to adjust the pressure being applied, to monitor the current pressure (applied and within the liner 109), and to react to (sometimes-sudden) changes in pressure within the liner. The pressure within the liner, in turn, controls the speed of the inversion process for the liner 109. Accordingly, there is little overall control of the speed of the inversion process. On the other hand, the inversion process works best when the speed of inversion is consistent and controlled. Variable or incorrect inversion speeds may lead to improper or early curing of the liner 109. Further, variable or incorrect inversion speeds may lead to stretches and bends in the liner 109, resulting in reduced structural integrity of the liner 109.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a system for installing a pipe liner into a host pipe, comprising: an inverter configured to invert the pipe liner by introducing pressure into the pipe liner; a top roller; and an assist system located between the inverter and the top roller, the assist system comprising: a main housing having a main housing top and a main housing bottom, and each of the main housing top and the main housing bottom having an opening; a first interior roller; a second interior roller; and a first motor.

In an embodiment of the system, the pipe liner is a cured-in-place pipe liner.

In an embodiment of the system, the first interior roller has around profile.

In an embodiment of the system, the second interior roller has a cam-shaped profile.

In an embodiment of the system, the first interior roller has around profile and the second interior roller has a cam-shaped profile.

In an embodiment of the system, the first interior roller further comprises a plurality of exterior roller wheel sections.

In an embodiment of the system, the plurality of exterior roller wheel sections comprise rubber.

In an embodiment of the system, the second interior roller further comprises a cam-shaped exterior roller wheel section.

In an embodiment of the system, the cam-shaped exterior roller wheel section comprises rubber.

In an embodiment of the system, the first motor drives said first interior roller, a second motor drives the second interior roller, the first motor is configured to be driven in a first direction, and the second motor is configured to be driven in a direction opposite to that of the first direction.

There is described herein, in an embodiment, a method for installing a pipe liner into a host pipe that: provides an inverter configured to invert the pipe liner by introducing pressure into the pipe liner; provides a top roller; provides an assist system located between the inverter and the top roller, the assist system comprising: a main housing having a main housing top and a main housing bottom, and each of the main housing top and the main housing bottom having an opening; a first interior roller; a second interior roller; and a first motor, and feeds the pipe liner onto the top roller, wherein the assist system feeds the pipe liner from the top roller to the inverter in an efficient and controller manner.

In an embodiment of the method, the pipe liner is a cured-in-place pipe liner.

In an embodiment of the method, the first motor drives the first interior roller, a second motor drives the second interior roller, the first motor is configured to be driven in a first direction, and the second motor is configured to be driven in a direction opposite to that of the first direction.

In an embodiment of the method, the feeding step is performed by a human operator.

In an embodiment of the method, the human operator lifts section of the pipe liner onto the top roller.

In an embodiment of the method, the human operator turns the top roller to feed additional portions of the pipe liner to the assist system.

In an embodiment of the method, the air pressure is controlled manually.

In an embodiment of the method, the method further comprises providing a holding system and adjusting the holding system to alter the drag placed on the pipe liner.

In an embodiment of the method, the first interior roller has a round profile and the second interior roller has a cam-shaped profile.

In an embodiment of the method, the cam roller includes a flat section, and the method further comprises the steps of rotating the flat section to be parallel to the pipe liner and manually feeding the inverter with the pipe liner without the assistance of the assist system.

DETAILED DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
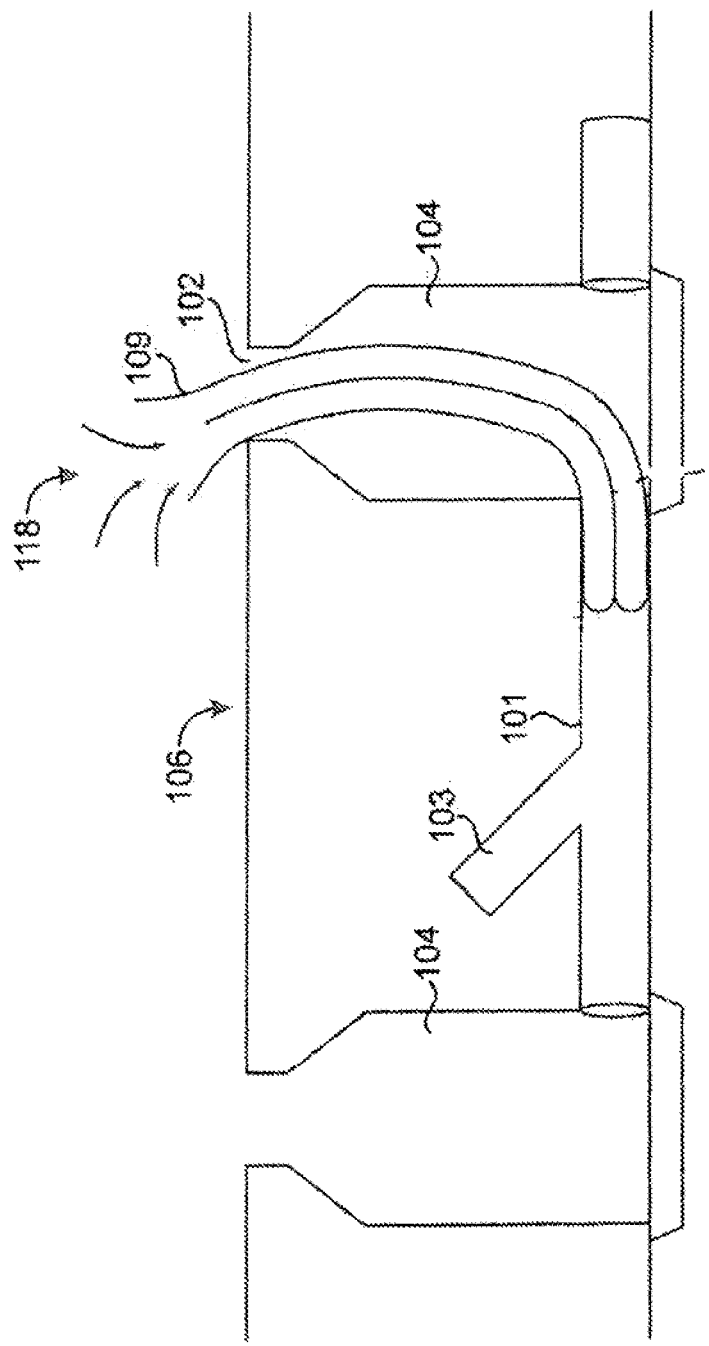
FIG. 1 depicts a diagram of a prior art cured-in-place pipe ("CIPP") liner installation process.
Figure 2:
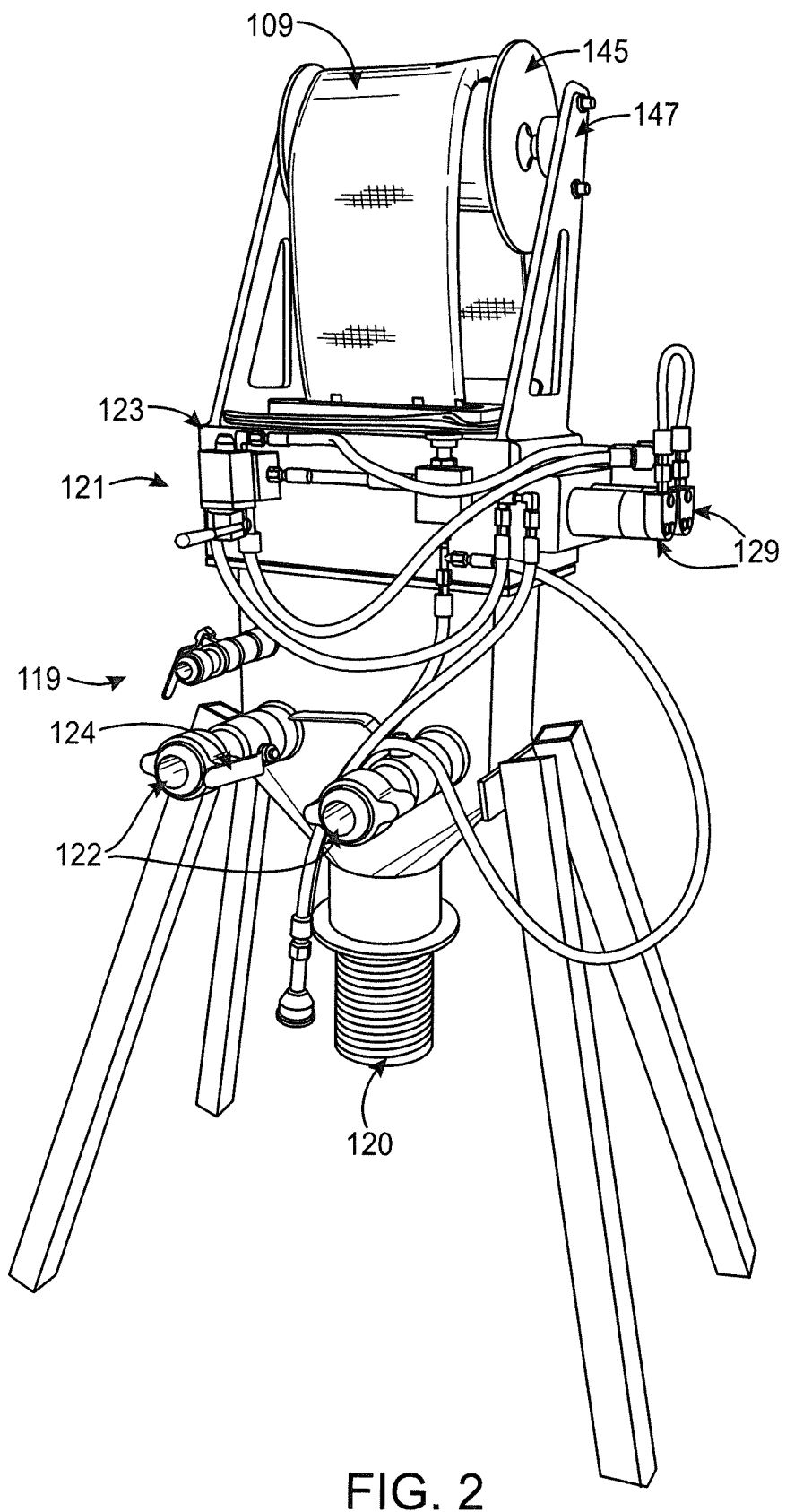
FIG. 2 depicts an embodiment of a mechanized inverter system including an inverter, an assist system, and a top roller according to the present disclosure.

Described herein, among other things, are embodiments of a system for installing a pipe liner 109 (such as a CIPP) including an inverter 119, which may be of a type known to those of ordinary skill in the art, an assist system 121, and a top roller 145 for feeding a pipe liner 109 into an inverter 119 in a more consistent and regular manner allowing for inverting of the pipe liner 109 in a more safe and effective manner. In the embodiment depicted in FIG. 2, the inverter 119, assist system 121, and top roller 145 are each integrated into a single chassis, wherein the top roller 145 sits on top of the assist system 121, which sits on top of the inverter 119, which is raised off the ground via a set of supports. In the depicted embodiment, the supports are legs, but may be any form of support known in the art. The inverter 119 also includes an egress pipe 120 on the bottom end of the inverter 119, which inverter 119 may be used to provide air into the pipe liner 109 that is run through the inverter 119 and out the egress pipe 120. The inverter 119 may include attachment points 122 for an air source (such as a compressor, blower, or other device capable of increasing air pressure above ambient pressure) that is used to provide the air pressure into the pipe liner 109. The air provision is generally manually controlled by an operator using a handle 124 connected to a valve or similar device. Air pressure values are typically provided to the operator via a dial pressure gauge. In some embodiments, the air pressure values may be provided by other means known in the art.

Figure 3:
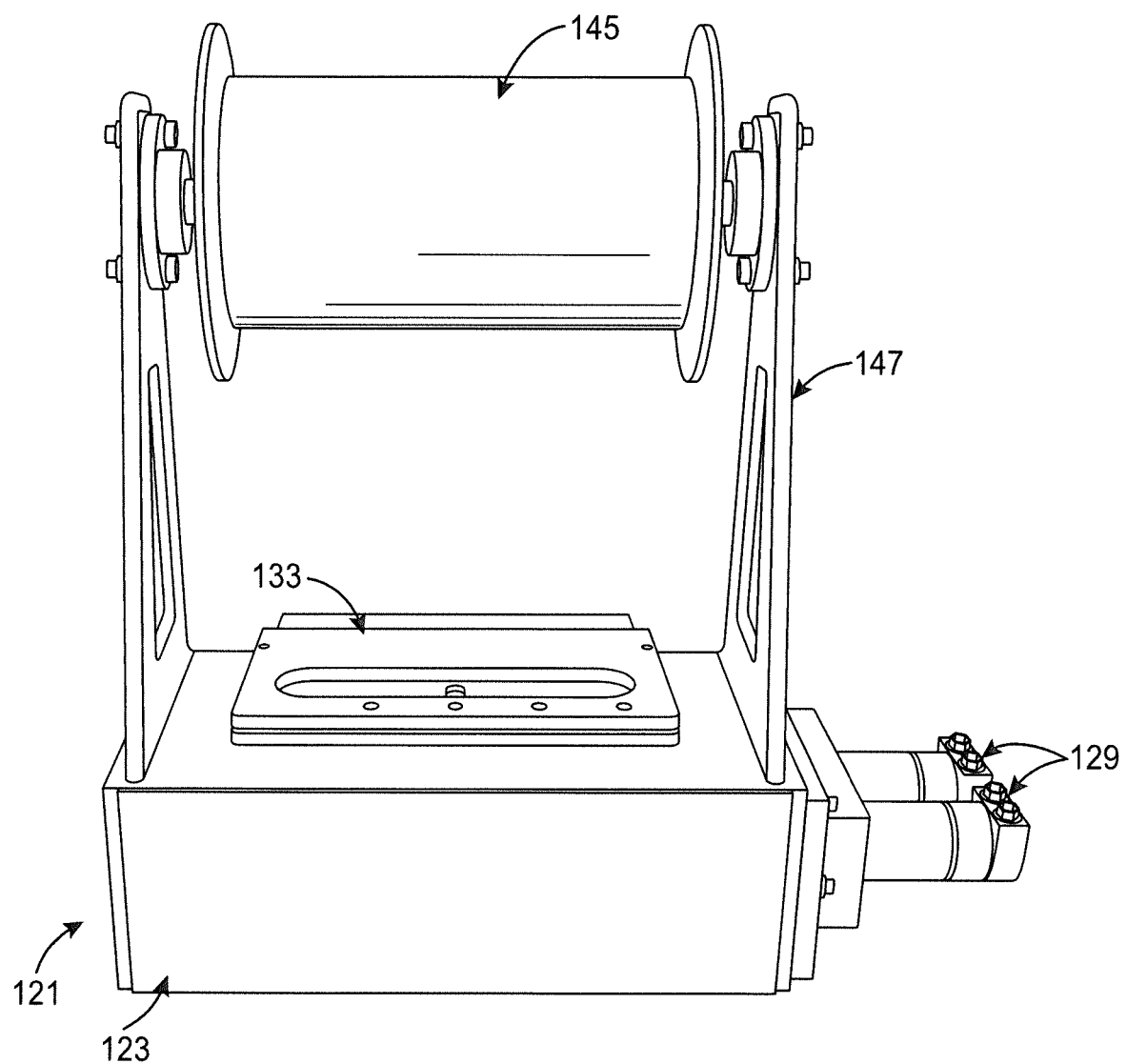
FIG. 3 depicts the inverter and top roller of FIG. 2.

FIG. 3 depicts further details of the assist system 121 and the top roller 145 separated from the inverter 119. The top roller 145 is suspended above the assist system 121 via assister supports 147. In the depicted embodiment, the assister supports 147 are triangular legs. In other embodiments, the assister supports may be any shape or construction known in the art.

Figure 4:
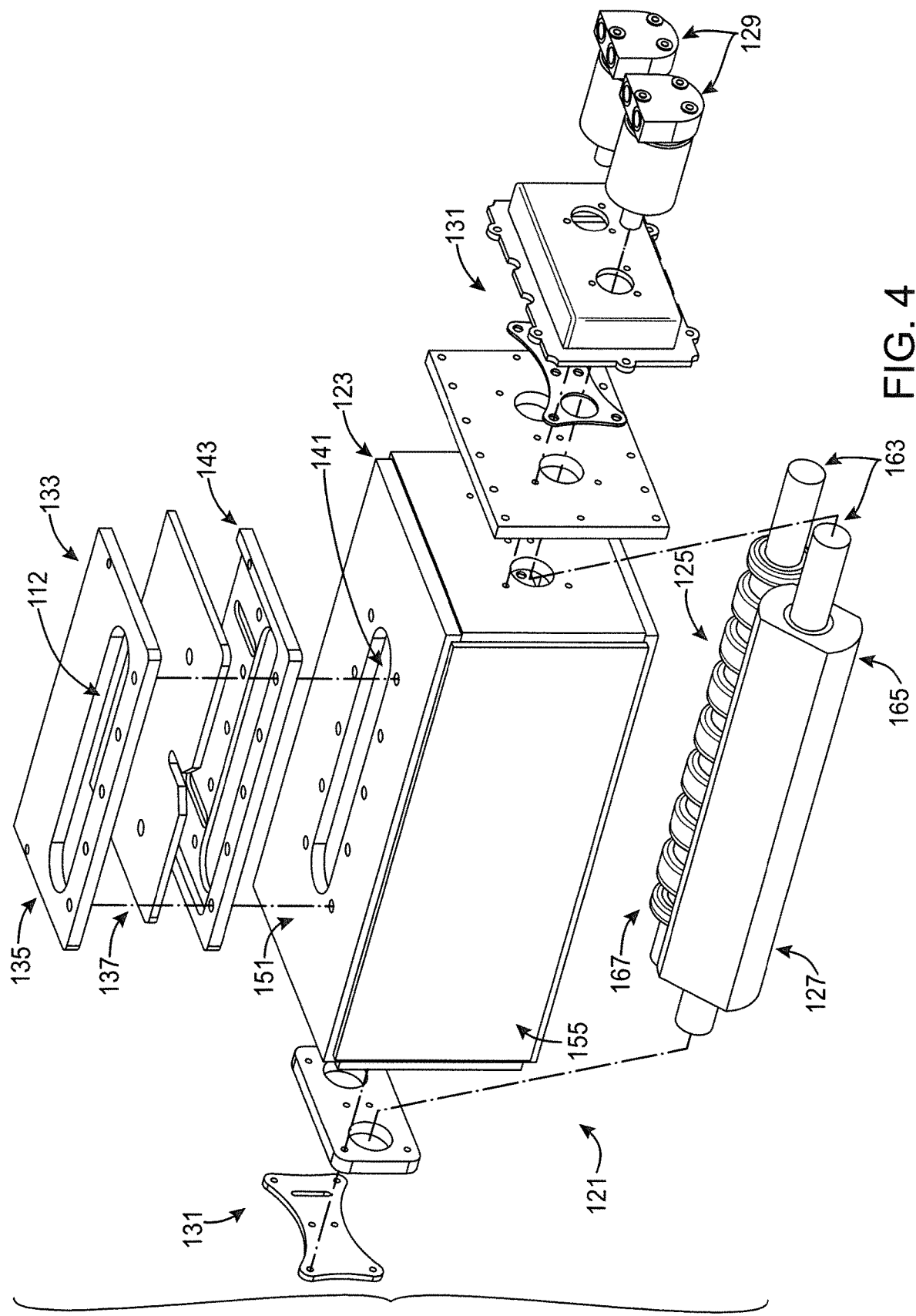
FIG. 4 depicts an exploded view of an embodiment of an assist system according to the present disclosure.
Figure 5:
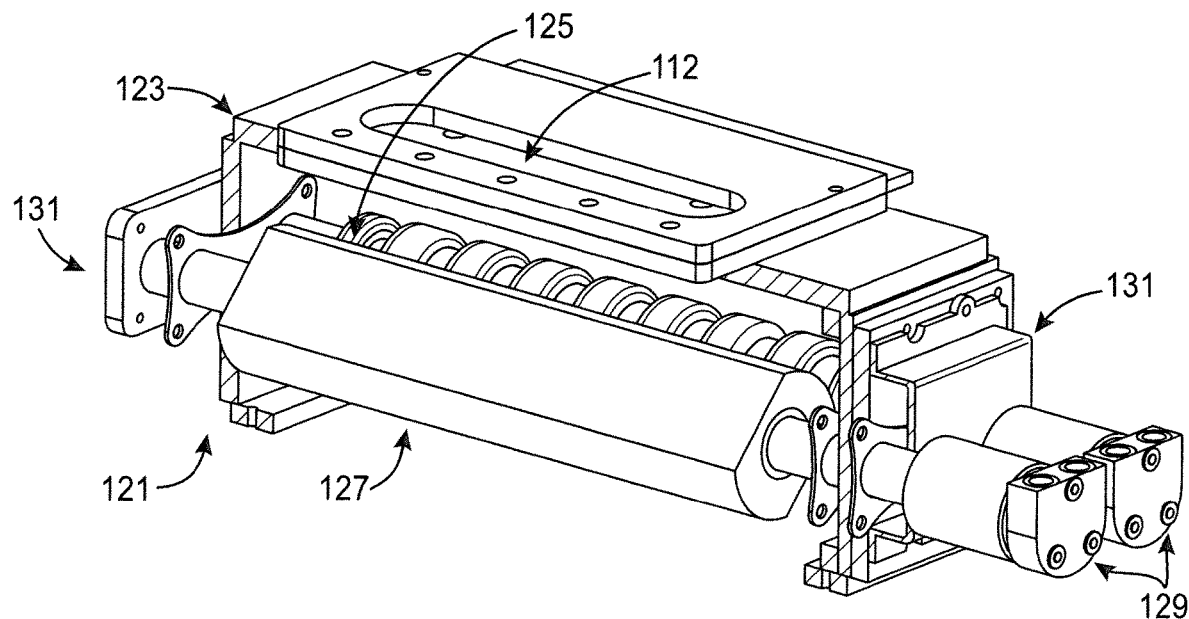
FIG. 5 depicts a perspective, cutaway view of an embodiment of an assist system in accordance with the present disclosure.
Figure 6:
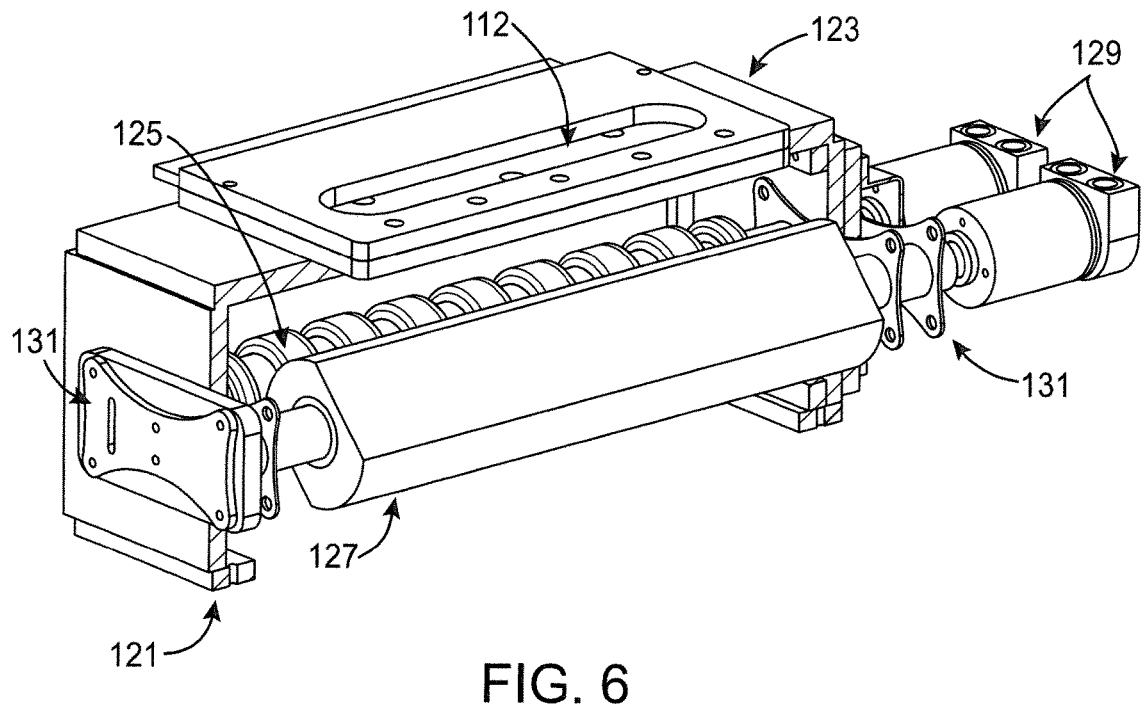
FIG. 6 depicts a perspective, cutaway view of an embodiment of an assist system in accordance with the present disclosure.
Figure 7:
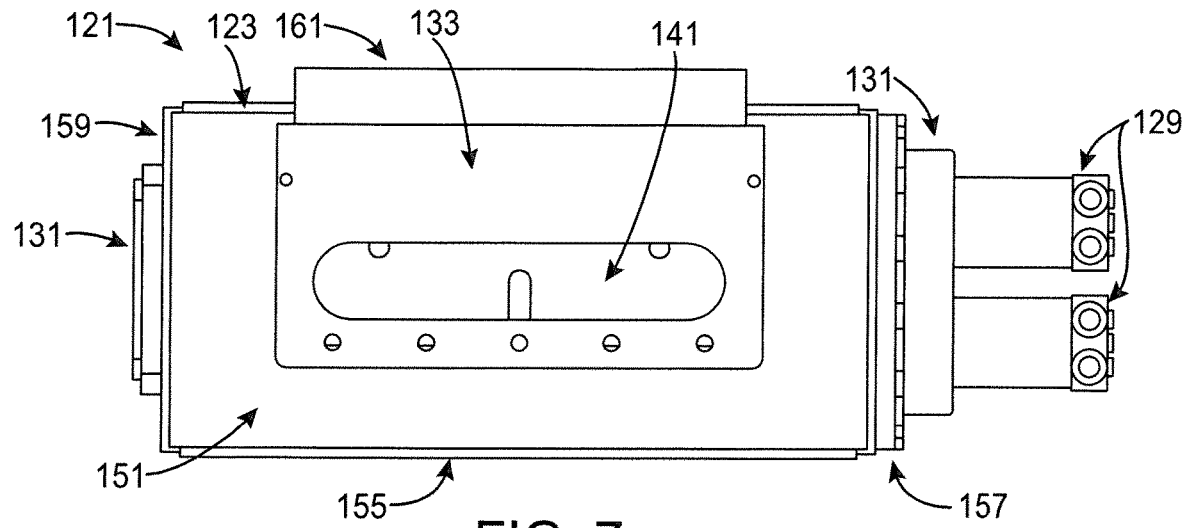
FIG. 7 depicts a plan view of view of an embodiment of an assist system in accordance with the present disclosure.
Figure 8:
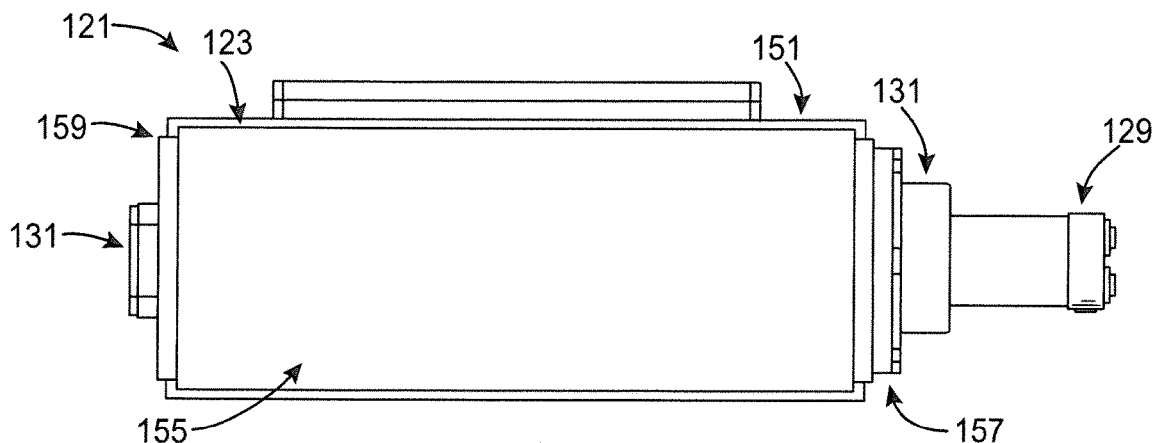
FIG. 8 depicts a side view of view of the assist system depicted in FIG. 7.
Figure 9:
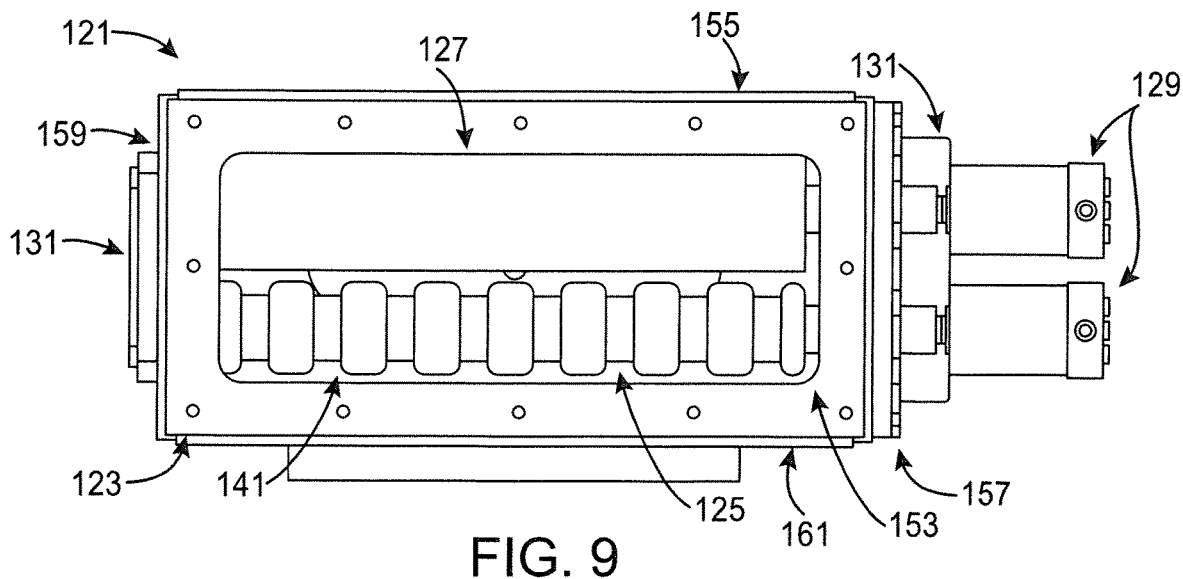
FIG. 9 depicts an opposite plan view of the assist system depicted in FIG. 7.

An embodiment of an assist system 121 is depicted in FIGS. 4-7. As best seen in FIG. 4, which shows an assist system 121 in an exploded form to illustrate the different components of the assist system 121, the assist system 121 includes a main housing 123 for mounting the other components of the assist system 121. The main housing 123 has a generally parallelepiped shape, which has a top 151, a bottom 153, a front 155, a back 161, a first side 157, and a second side 159. The main housing 123 may be fixed to the inverter 119 and/or to the top roller 145, and/or to any other component or structure of the inverter system. A round roller 125 and a cam roller 127 are provided within the main housing 123 during operation of the assist system 121. The main housing 123 may be formed of any material capable of preventing ingress of unwanted objects into the main housing 123, in turn preventing exterior objects from interfering with the round roller 125 and the cam roller 127.

For the purposes of this disclosure, directional terms, such as "top" and "bottom," will be used when referring to portions of various components, such as the main housing 123. One of ordinary skill in the art will understand that depending on the arrangement of the components and how the components are used, the portions of the components referred to may have different spatial orientations than those depicted in the figures herein. That is, the "top" may be above or below the "bottom," or arrange in any spatial orientation, such as on the same horizontal plane that is parallel to the ground. For the purposes of this disclosure, the "top" of the main housing 123 is the side of the main housing 123 into which the pipe liner 109 is fed. Further, a person of ordinary skill in the art would understand that a "top" side is opposite to a "bottom" side. Accordingly, these directional terms are not used herein to strictly mean relative orientations to ground.

In the depicted embodiment, the round roller 125 is comprised of a central shaft 163 and a plurality of exterior roller wheel sections 167. The plurality of exterior roller wheel sections 167 will be generally round in shape, but in other embodiments, may be any shape with reliably and consistently feed a pipe liner 109 through the main housing 123. In an embodiment, the shaft 163 comprises a metal material and the plurality of exterior roller wheel sections 167 comprise rubber. In other embodiments, the shaft 163 and the plurality of exterior roller wheel sections 167 may be formed from a single material. In other embodiments, the shaft 163 and the plurality of exterior roller wheel sections 167 may be assembled from two or more pieces, the pieces being the same material or different materials. In other embodiments, the shaft 163 may be any material that is capable of withstanding the forces of being rotated in the assist system 121. Further, more or fewer exterior roller wheel sections 167 may be used, or a continuous section may be used instead of separated rollers. Moreover, a material other than rubber that is capable of gripping the pipe liner 109 while rotating may be used.

In the depicted embodiment, the cam roller 127 is comprised of a central shaft 163 and a cam-shaped exterior roller wheel section 165 that may be a single, continuous piece of material. In an embodiment, the shaft 163 comprises a metal material and the cam-shaped exterior roller wheel section 165 comprises rubber. In other embodiments, the shaft 163 and the cam-shaped exterior roller wheel section 165 may be formed from a single material. In other embodiments, the shaft 163 and the cam-shaped exterior roller wheel section 165 may be assembled from two or more pieces, the pieces being the same material or different materials. In other embodiments, the shaft 163 may be any material that is capable of withstanding the forces of being rotated in the assist system 121. The cam-shaped exterior roller wheel section 165 may be formed by a plurality of individual sections and/or may include discontinuous sections, and may be made of rubber. Further, a material other than rubber that is capable of gripping the pipe liner 109 while rotating may be used.

The depicted cam-shape includes two diametrically opposed rounded sections and two diametrically opposed flat sections. More or less round or flat sections may be used. In alternate embodiments, the cam-shaped roller 127 may have any shape capable of gripping the pipe liner 109. The round roller 125 and the cam roller 127 are placed within the main housing 123 during operation. The shafts 163 of the round roller 125 and cam roller 127 typically extend through either side of the main housing 123. The ends of the shafts 163 of the round roller 125 and cam roller 127 are then mounted to brackets 131 on opposite ends of the main housing 123. In the depicted embodiment, the bracket 131 on the second side 159 of the main housing 123 includes a mounting portion and a cover portion. On the first side 157 of the main housing 123, the bracket 131 includes a mounting portion, a bridging portion, and a motor mounting portion.

On the motor mounting portion is also mounted two motors 129. Each motor 129 is connected to the shaft 163 of either the round roller 125 or the cam roller 127. In other embodiments, any bracket 131 known in the art may be used and the shafts 163 may be covered or exposed. Further, more or less parts may be included in each bracket 131 and/or multiple parts of the bracket 131 may be formed integrally. Further, in an embodiment, the two motors 129 are mounted on opposite sides of the main housing 123. In another alternate embodiment, the shaft 163 of either the round roller 125 or the cam roller 127 may be controlled by more than one motor 129, or a single motor 129 may control both shafts 163. The motor 129 may be any motor known in the art. Generally, the motor 129 is an electric motor and includes its own battery or power source.

During operation, motors 129 may be activated to feed the pipe liner 109 into the inverter 119. The motors 129 will typically turn the shafts 163 of the round roller 125 and the cam roller 127 in opposite directions to move the pipe liner 109 downwards towards the inverter 119. The round roller 125 and the cam roller 127 generally apply a force to the pipe liner 109 and move the pipe liner 109 using friction created by the forces between the two rollers. The round sections of the cam roller 127 allow for the cam roller 127 and the round roller 125 to work together to move a section of the pipe liner 109 when each is rotating (in opposite directions). The feeding speed may be held constant by keeping the movement of the motors 129 constant. Alternatively, the feeding speed and motor speed(s) may vary during operation. For example, the motor speed(s) may begin slow and speed up as the inversion process begins and proceeds. On the other hand, the flat sections of the cam roller 127 allow the pipe liner 109 to pass by the cam roller 127 and the round roller 125 to facilitate manual feeding of the pipe liner 109, if desired. In such an embodiment, the flat sections of the cam roller 127 will held in an orientation towards the pipe liner 109, allowing the pipe liner 109 to slip by the round roller 125 and the cam roller 127. Further, the motors 129 will generally be turned off when manually feeding the pipe liner 109 so that the cam roller 127 and the round roller 125 do not impede the feeding of the pipe liner 109 through the assist system 121 and inverter 119.

As best depicted in FIG. 4, the top 151 of the main housing 123 that is parallel to the shafts 163 of the round roller 125 and the cam roller 127 may include an opening 141. In addition, the bottom 153 (side opposite the top 151 of the main housing 123) may also have an opening 141. In the depicted embodiment, one of the openings 141 may have a generally stadium or racetrack shape, but each opening 141 may have any shape that will facilitate safe passage of the pipe liner 109 generally in a flattened form. In an embodiment, the openings 141 on the top 151 and the bottom 153 of the main housing 123 may be aligned. In other embodiments, the openings 141 on the top 151 and the bottom 153 of the main housing 123 may be disposed at any degree of skew. Further, in the depicted embodiment, the openings 141 are different shapes and different sizes, with the opening 141 in the bottom 153 being larger than the opening 141 in the top 151. In another embodiment, the openings 112 are the same shape and size. In other embodiments, the opening may be any shape and size that will facilitate safe passage of the pipe liner 109.

As best depicted in FIG. 4, the assist system 121 may further comprise a holding system 133, which in turn includes a top plate 135, a pinch plate 137, and a bottom plate 143. Further, the holding system 133 includes a feed hole 112 in both the top plate 135 and the bottom plate 143. The top plate 135 and bottom plate 143 may be mounted to each other, and when combined, may provide a space there between for the pinch plate 137 to slide back and forth. The holding system 133 may then be mounted on the top 151 of the main housing 123. The pinch plate 137 may then be moved back and forth within the holding system 133, adding friction or removing friction from the pipe liner 109 being fed into the assist system 121.

An embodiment of a method of using an assist system 121 will now be described. First, as described above, the host pipe 101 to be fitted with a pipe liner 109 is reviewed, cleaned, and otherwise prepared, as known in the art. The pipe liner 109 is also prepared in advance, either before being brought to the host pipe 101 or near to the host pipe 101. As described above, the pipe liner 109 is impregnated with a resin and stored in a manner sufficient to prevent the resin from curing prematurely. For example, the pipe liner 109 may be stored in a refrigerated truck or in an ice bath.

At some point during the process, the inverter 119, assist system 121, and top roller 145 are assembled at or near an opening 102 at the surface 106 for accessing the host pipe 101. In the embodiment depicted in FIG. 2, the inverter 119, assist system 121, and top roller 145 are formed all on the same chassis. In other embodiments, the inverter 119, assist system 121, and top roller 145 may be formed on different chassis. In any case, the top roller 145 will be placed generally above the assist system 121. Further, the assist system 121 will be placed generally above the inverter 119. This arrangement is generally preferable because it allows gravity to assist with the feeding of the pipe liner 109 into the assist system 121, from assist system 121 into the inverter 119, and from the inverter 119 into the opening 102.

However, in alternate embodiments, any other orientation may be used, with or without intervening steps, processes, or machinery.

After placement of the inverter 119, assist system 121, and top roller 145 system, herein called the mechanized inverter system, the pipe liner 109 may now be mounted on the top roller 145 and loaded into the assist system 121. In doing so, the pipe liner 109 may be moved from its cooling location to a location proximate to the mechanized inverter system. In some embodiments, at least some of the pipe liner 109 may remain in the cooling location. The mounting of the pipe liner 109 onto the top roller 145 involves hoisting a first end of the pipe liner 109 over the top roller 145. The first end of the pipe liner 109 is then fed into the assist system 121. The first end of the pipe liner 109 is then fed though the assist system 121 and into the inverter 119. The first end of the pipe liner 109 is then fed though the inverter 119 and out of the egress pipe 120, where the first end of the pipe liner 109 is secured around the exterior of the egress pipe 120. At this point, the inversion process may proceed.

The inversion process generally proceeds as it would in prior art processes, but in the method described herein, the pipe liner 109 is fed into the inverter 121 from the assist system 121. Air pressure is introduced into the inverter 121 to pressurize the pipe liner 109, which pressurization will begin the inversion process. The air pressure is generally manually controlled by an operator, who may monitor air pressure by using a dial air pressure gage, or by using any other means of monitoring air pressures known in the art, such as by visually inspecting the pipe liner 109. The assist system 121 will then begin to feed the inverter 119 additional portions of the pipe liner 109 as the pipe liner 109 inverts. At generally the same time, the assist system 121 will be fed additional portions of the pipe liner 109 from the top roller 145. The additional portions of the pipe liner 109 may be fed to the assist system 121 and/or top roller 145 in different ways. For example, an operator may physically lift subsequent sections of the pipe liner 109 onto the top roller 145. In alternate embodiments, the top roller 145 may be turned to pull subsequent sections of the pipe liner 109 onto the top roller 145. Such turning may be done manually or by a motor. The assist system 121 feeds the pipe liner 109 to the inverter 121 by turning its round roller 125 and cam roller 127 in opposite directions. This system of opposite rotations will allow the round roller 125 and cam roller 127 to contact the pipe liner 109 and feed the pipe liner 109 towards the inverter 119 using friction created by pressure between and movement of the round roller 125 and cam roller 127. The assist system 121 will generally continue to operate until all of the pipe liner 109 has been fed into the inverter 109.

If at any time it is desired that the pipe liner 109 be manually manipulated, the cam roller 127 may be stopped when one of its flat surfaces faces the round roller 125 and the pipe liner 109. This may be accomplished by using the motor 129 to rotate the cam roller 127 until a flat surface is facing the round roller 125. Alternately, the cam roller may be manually turned with the motor 129 off until a flat surface is facing the round roller 125. At this point in the cam roller's 127 rotational orientation, the pipe liner 109 may be free of pressure between the round roller 125 and the cam roller 127. Thus, the pipe liner 109 may be freely moved in this orientation because there is no friction between the cam roller 127, the round roller 125, and the pipe liner 109. This free movement allows a user to bypass the automatic feeding of the pipe liner 109, so that the pipe liner 109 may be manually fed into the inverter 121.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "round" are purely geometric constructs and no real-world component is a true "round" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A system for installing a pipe liner into a host pipe, the system comprising:
   an inverter configured to invert said pipe liner by introducing pressure into said pipe liner;
   a top roller; and
   an assist system located between said inverter and said top roller, said assist system comprising:
     a main housing having a main housing top and a main housing bottom, and each of said main housing top and said main housing bottom having an opening;
     a first motor driving a first interior roller in a first direction;
     a second motor driving a second interior roller in a direction opposite to said first direction.

2. The system of claim 1, wherein said pipe liner is a cured-in-place pipe liner.

3. The system of claim 1, wherein said first interior roller has a round profile.

4. The system of claim 1, wherein said second interior roller has a cam-shaped profile.

5. The system of claim 1, wherein said first interior roller has a round profile and said second interior roller has a cam-shaped profile.

6. The system of claim 5, wherein said first interior roller further comprises a plurality of exterior roller wheel sections.

7. The system of claim 6, wherein said plurality of exterior roller wheel sections comprise rubber.

8. The system of claim 5, wherein said second interior roller further comprises a cam-shaped exterior roller wheel section.

9. The system of claim 8, wherein said cam-shaped exterior roller wheel section comprises rubber.

10. A method for installing a pipe liner into a host pipe, the method comprising:
    providing an inverter configured to invert said pipe liner by introducing pressure into said pipe liner,
    providing a top roller;
    providing an assist system located between said inverter and said top roller, said assist system comprising:
        a main housing having a main housing top and a main housing bottom, and each of said main housing top and said main housing bottom having an opening;
        a first motor driving a first interior roller in a first direction;
        a second motor driving a second interior roller in a direction oposite to said first direction;
    placing said pipe liner onto said top roller; and
    feeding said pipe liner through said assist system into said inverter.

11. The method of claim 10, wherein said pipe liner is a cured-in-place pipe liner.

12. The method of claim 10, wherein the placing step is performed by a human operator.

13. The method of claim 12, wherein said human operator lifts section of said pipe liner onto the top roller.

14. The method of claim 12, wherein said human operator turns said top roller to feed additional portions of said pipe liner to said assist system.

15. The method of claim 10, wherein said pressure is controlled manually.

16. The method of claim 10, further comprising providing a holding system that is configured to regulate an amount of drag placed on said pipe liner and adjusting the holding system to alter the amount of drag placed on said pipe liner.

17. The method of claim 10, wherein said first interior roller has a round profile and said second interior roller has a cam-shaped profile.

18. The method of claim 17, wherein said second interior roller includes a flat section, and said method further comprises;
    said second motor rotating said second interior roller to place said flat section to be parallel to said pipe liner; and
    stopping said first and said second motors; to allow manual feeding of said inverter with said pipe liner without the assistance of said assist system.

\* \* \* \* \*